Jan. 25, 1927.

W. V. D. KELLEY ET AL 1,615,283

PHOTOGRAPHY

Filed Feb. 5, 1924

INVENTOR
William V. D. Kelley
Dominick Trovolone
BY
Lyman E. Dodge
ATTORNEY

Patented Jan. 25, 1927.

1,615,283

UNITED STATES PATENT OFFICE.

WILLIAM V. D. KELLEY, OF JERSEY CITY, AND DOMINICK TRONOLONE, OF FORT LEE, NEW JERSEY, ASSIGNORS TO KELLEY COLOR LABORATORY, INC., OF PALISADE, NEW JERSEY, A CORPORATION OF NEW JERSEY.

PHOTOGRAPHY.

Application filed February 5, 1924. Serial No. 690,721.

This invention relates to photography and particularly to what is known as motion pictures especially when utilized for amusement purposes.

A principal object of this invention is to provide a choice of pictures to be viewed by a single audience at a particular time using only one screen.

Other objects and advantages will appear as the description of the invention progresses and the novel feature will be pointed out in the appended claims.

Figure 1:
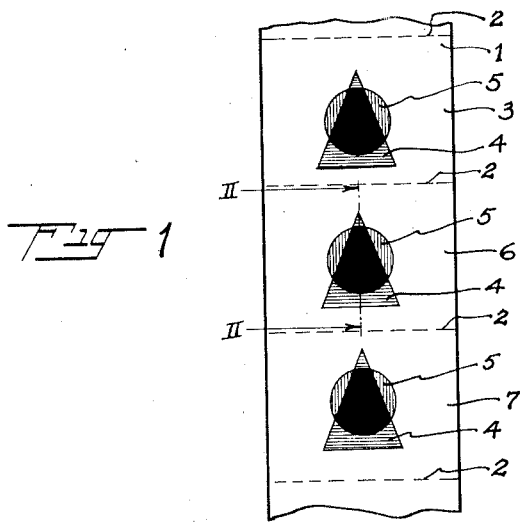
Figure 2:
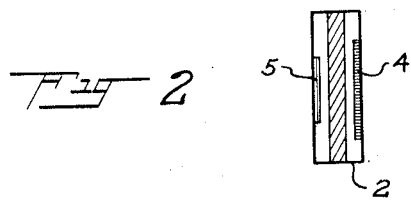
Figure 3:
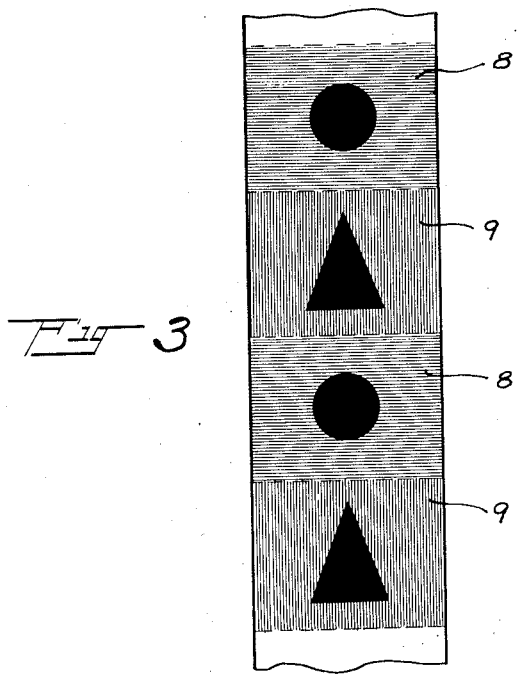

In describing the invention in detail reference will be had to the accompanying drawings and the figures thereof and the numerals thereon illustrating means for practicing the invention, in which:

Figure 1 illustrates a face view of a fragment of ordinary positive motion picture film; Fig. 2, illustrates a cross sectional view of one image area substantially on the line II—II of Fig. 1; Fig. 3, illustrates a face view of a fragment of a modified form of ordinary positive motion picture films.

In the drawing, 1 designates a fragment of ordinary positive motion picture film which may be called a composite film, illustrated as composed of separate image areas by the dotted lines 2. The image area 3 is illustrated as containing an image of a triangle 4 and a disc 5. The other image areas 6 and 7 illustrate the same triangle 4 and disc 5 but in different relative positions so that the appearance of motion will be produced upon projection in the usual way.

If the triangle image is toned substantially a green blue and the disc image substantially an orange red, colors substantially complementary and a substantially white light is used for projection then when the projected image is viewed with the naked eye the portions of the images which are superimposed will appear black, but where not superimposed they will each appear their toned color. If, however, the projected image is viewed, say, with spectacles having fitted herein a green-blue transparency for each eye, then the disc image will appear as a black disc and the triangle will not be observed. If an orange red transparency is used then the triangle only will be seen in black. This phenomena is well recognized and deserves no detailed explanation.

It must be readily understood that one image of each image space may well be a representation of a comedy whilst the other may well be the representation of a tragedy. With such a combination and one portion of an audience viewing the projection through a green blue transparency and another viewing it through an orange red transparency it might well be that a portion of the audience would be indulging in hilarious laughter and the other portion would be on the verge of shedding tears. At any rate many amusing situations could be created. If the patron wants a good cry provide him with blue transparency; if he wants something spicy provide him with the red transparency.

It requires nothing not within the skill of those versed in the colored motion picture art to produce all of the apparatus, devices and manufactures necessary to practice this invention.

The known methods of producing the positive film may be utilized. The positive may be single coated film having two images in each image area, or double coated film having two images in each image area, one on one side and one on the other. If desired a positive film as illustrated by Fig. 3 may be utilized to practice this invention. Fig. 3 has one image only in each image area and adjacent areas exhibit different images. Image area 8 exhibits an image of a disc, area 9 of a triangle and so on alternately. The images are black but the surrounding colloid is colored. Image area 8 is colored green-blue and area 9 orange red. This film must be projected at double the speed of a film such as is shown by Fig. 1, as is obvious.

Although the invention has been fully described and the principle explained in connection with specific instrumentalities, nevertheless it is desired to state that applicants' invention is not limited in its practice to the particular specific instrumentalities illustrated to disclose the nature of the invention.

What we claim as new and desire to secure by Letters Patent of the United States, is:

1. The method of simultaneously projecting two pictures, one of one subject and another of an entirely different subject productive of an entirely different emotional effect, on a screen and providing two means for viewing said pictures, such that if one of the means is used, one of the pictures is visible and if the other means is used, the other picture is visible.

2. The method of exhibiting which consists in forming a plurality of images of different subjects each productive of an entirely different emotional effect on a single image space and providing alternative means to be used by an observer whereby an individual observer may see the image of a single subject only at a given instant but at that instant may see either depending on the means selected.

3. The process of utilizing motion pictures which consists in projecting onto a curtain from a composite film bearing images of two subjects each productive of an entirely different emotional effect one toned in one color and the other subject colored substantially complementary and causing one part of an audience to view the pictures through a transparency colored complementary to the color of one image and another part of the same audience to view the pictures through a transparency colored complementary to the first mentioned transparency so that each part of the audience sees images of but one of the two subjects.

4. The process of utilizing motion pictures which consists in fitting part of an audience to view with red spectacles and the other part with blue spectacles, projection on to a curtain from a composite film consisting of two dissimilar subjects each productive of an entirely different emotional effect each toned in colors complementary to the spectacles, so that each part of the audience sees but one of the two pictures.

5. A motion picture film containing two subjects each productive af an entirely different emotional effect, each toned a different color, so that when viewed through color filters but one subject is seen at one time.

WILLIAM V. D. KELLEY.
DOMINICK TRONOLONE.